US012748777B2

(12) United States Patent
Chen et al.

(10) Patent No.: US 12,748,777 B2
(45) Date of Patent: Sep. 29, 2026

(54) DATA PROCESSING METHOD FOR MACHINE LEARNING AND ELECTRONIC DEVICE USING THE SAME

(71) Applicant: ACER INCORPORATED, New Taipei City (TW)

(72) Inventors: Pei-Jung Chen, New Taipei City (TW); Tsung-Hsien Tsai, New Taipei City (TW); Ke-Han Pan, New Taipei City (TW); Yun-Hsuan Chan, New Taipei City (TW); Sheng-Wei Chu, New Taipei City (TW); Pin-Cyuan Lin, New Taipei City (TW)

(73) Assignee: ACER INCORPORATED, New Taipei City (TW)

( * ) Notice: Subject to any disclaimer, the term of this patent is extended or adjusted under 35 U.S.C. 154(b) by 84 days.

(21) Appl. No.: 18/771,917

(22) Filed: Jul. 12, 2024

(65) Prior Publication Data

US 2025/0238438 A1 Jul. 24, 2025

(30) Foreign Application Priority Data

Jan. 18, 2024 (TW) ................................ 113102037

(51) Int. Cl.
*G06F 7/00* (2006.01)
*G06F 5/01* (2006.01)
(Continued)

(52) U.S. Cl.
CPC .............. *G06F 16/278* (2019.01); *G06F 5/01* (2013.01); *G06N 20/00* (2019.01)

(58) Field of Classification Search
None
See application file for complete search history.

(56) References Cited

U.S. PATENT DOCUMENTS

2006/0090114 A1* 4/2006 Duffy ..................... G06V 40/18 714/746
2020/0075165 A1 3/2020 Lieberman
(Continued)

FOREIGN PATENT DOCUMENTS

CN 102831288 A 12/2012
CN 106295139 B 4/2019
(Continued)

*Primary Examiner* — Tuan A Pham
(74) *Attorney, Agent, or Firm* — Birch, Stewart, Kolasch & Birch, LLP

(57) ABSTRACT

A data processing method for the machine learning and an electronic device using the same are provided. The data processing method for the machine learning includes the following steps. For a plurality of sources, a source balancing procedure is performed on an original measuring data to obtain a balanced distribution map. For each of the subjects, a personalization scaling procedure is performed on a plurality of detection values to obtain a personalized scaled measuring data. For each of the sources, a source scaling procedure is performed on the detection values to obtain a by-source scaled measuring data. The balanced distribution map, the personalized scaled measuring data and the by-source scaled measuring data are combined to obtain a balanced personalized scaled data and a balanced by-source scaled data. Based on the balanced personalized scaled data and the balanced by-source scaled data, some of the detection items are outputted.

20 Claims, 6 Drawing Sheets

(51) Int. Cl.

| | |
|---|---|
| ***G06F 16/27*** | (2019.01) |
| ***G06F 17/00*** | (2019.01) |
| ***G06N 20/00*** | (2019.01) |

(56) References Cited

U.S. PATENT DOCUMENTS

| | | | | |
|---|---|---|---|---|
| 2022/0115135 | A1 | 4/2022 | Lieberman | |
| 2022/0391678 | A1 * | 12/2022 | Zhang | G06N 3/04 |
| 2024/0005150 | A1 * | 1/2024 | Dugger | G06N 3/09 |
| 2024/0389917 | A1 * | 11/2024 | Minusa | A61B 5/165 |

FOREIGN PATENT DOCUMENTS

| | | | |
|---|---|---|---|
| TW | 202201291 | A | 1/2022 |
| TW | M631912 | U | 9/2022 |
| TW | 202307218 | A | 2/2023 |

* cited by examiner

DATA PROCESSING METHOD FOR MACHINE LEARNING AND ELECTRONIC DEVICE USING THE SAME

This application claims the benefit of Taiwan application Serial No. 113102037, filed Jan. 18, 2024, the subject matter of which is incorporated herein by reference.

BACKGROUND OF THE INVENTION

Field of the Invention

The invention relates in general to a processing method and an electronic device using the same, and more particularly to a data processing method for machine learning and an electronic device using the same.

Description of the Related Art

According to machine learning technology, when more detection items are used in model building, normally prediction accuracy will be increased. However, if unsuitable detection items are used, prediction accuracy will decrease instead. Therefore, the detection items need to be selected and decided before they are used in the model building and prediction inference of the machine learning model.

Besides, in real application, data come from numeral sources. For instance, in medical field, commonly seen source differences may include the brands and makes of inspection apparatuses or hospitals. Such source differences may lead to a reduction in the performance of model building and prediction inference using machine learning technology. Take blood test for instance. Different hospital may use different inspection apparatuses or different numeric units. blood values have different numeric intervals in different inspection apparatuses. For instances, the blood values can be 20 to 2000 in AA machine and 100 to 10000 in BB machine. Since the same value can mean differently in different machines, the predictive effect will be poor if the model is trained using data of different numeric intervals.

SUMMARY OF THE INVENTION

The invention is directed to a data processing method for the machine learning and an electronic device using the same. During the process of selecting the detection items of original measuring data, the original measuring data of different sources are properly treated, so that prediction accuracy of the machine learning model can be increased. The quantity balanced and value scaled original measuring data possess excellent extendibility and are beneficial to the training and amendment of the machine learning model.

According to one embodiment of the present invention, a data processing method for the machine learning is provided. The data processing method for the machine learning includes the following steps. For a plurality of sources, a source balancing procedure is performed on an original measuring data to obtain a balanced distribution map. In the balanced distribution map, the quantity of data items obtained from each of the sources is identical, and the original measuring data comprises a plurality of subjects corresponding to a plurality of detection values of a plurality of detection items. For each of the subjects, a personalization scaling procedure is performed on the detection values to obtain a personalized scaled measuring data. In the personalized scaled measuring data, the detection values of each of the subjects are scaled to the same numeric interval.

For each of the sources, a source scaling procedure is performed on the detection values to obtain a by-source scaled measuring data. In the by-source scaled measuring data, the detection values of each of the sources are scaled to the same numeric interval. The balanced distribution map, the personalized scaled measuring data and the by-source scaled measuring data are combined to obtain a balanced personalized scaled data and a balanced by-source scaled data. The balanced personalized scaled data and the balanced by-source scaled data are split into a plurality of splits, each corresponding to all of the sources. Each of the splits is sampled to obtain a predictive ability table through analysis. The predictive ability table comprises a predictive ability of each of the detection items. Based on the predictive ability table, some of the detection items are outputted. The outputted detection items are used for a machine learning model to perform model building, training or prediction inference.

According to another embodiment of the present invention, an electronic device is provided. The electronic device includes a source quantity balancing unit, a personalization scaling unit, a source scaling unit, a combination unit and an extraction unit. The source quantity balancing unit is used to, for a plurality of sources, perform a source balancing procedure on an original measuring data to obtain a balanced distribution map. In the balanced distribution map, the quantity of data items obtained from each of the sources is identical. The original measuring data includes a plurality of subjects corresponding to a plurality of detection values of a plurality of detection items. The personalization scaling unit used to, for each of the subjects, perform a personalization scaling procedure on the detection values to obtain a personalized scaled measuring data. In the personalized scaled measuring data, the detection values of each of the subjects are scaled to the same numeric interval. The source scaling unit used to, for each of the sources, perform a source scaling procedure on the detection values to obtain a by-source scaled measuring data. In the by-source scaled measuring data, the detection values of each of the sources are scaled to the same numeric interval. The combination unit used to combine the balanced distribution map, the personalized scaled measuring data and the by-source scaled measuring data to obtain a balanced personalized scaled data and a balanced by-source scaled data. The extraction unit includes a splitter, a calculator and a selector. The splitter used to split the balanced personalized scaled data and the balanced by-source scaled data into a plurality of splits, each corresponding to all of the sources. The calculator used to sample each of the splits perform and obtain a predictive ability table through analysis. The predictive ability table comprises a predictive ability of each of the detection items. The selector used to, based on the predictive ability table, output some of the detection items. The outputted detection items are used for a machine learning model to perform model building, training or prediction inference.

The above and other aspects of the invention will become better understood with regard to the following detailed description of the preferred but non-limiting embodiment(s). The following description is made with reference to the accompanying drawings.

DETAILED DESCRIPTION OF THE INVENTION

Technical terms are used in the specification with reference to the prior art used in the technology field. For any terms described or defined in the specification, the descriptions and definitions in the specification shall prevail. Each embodiment of the present disclosure has one or more technical features. Given that each embodiment is implementable, a person ordinarily skilled in the art can selectively implement or combine some or all of the technical features of any embodiment of the present disclosure.

Figure 1:
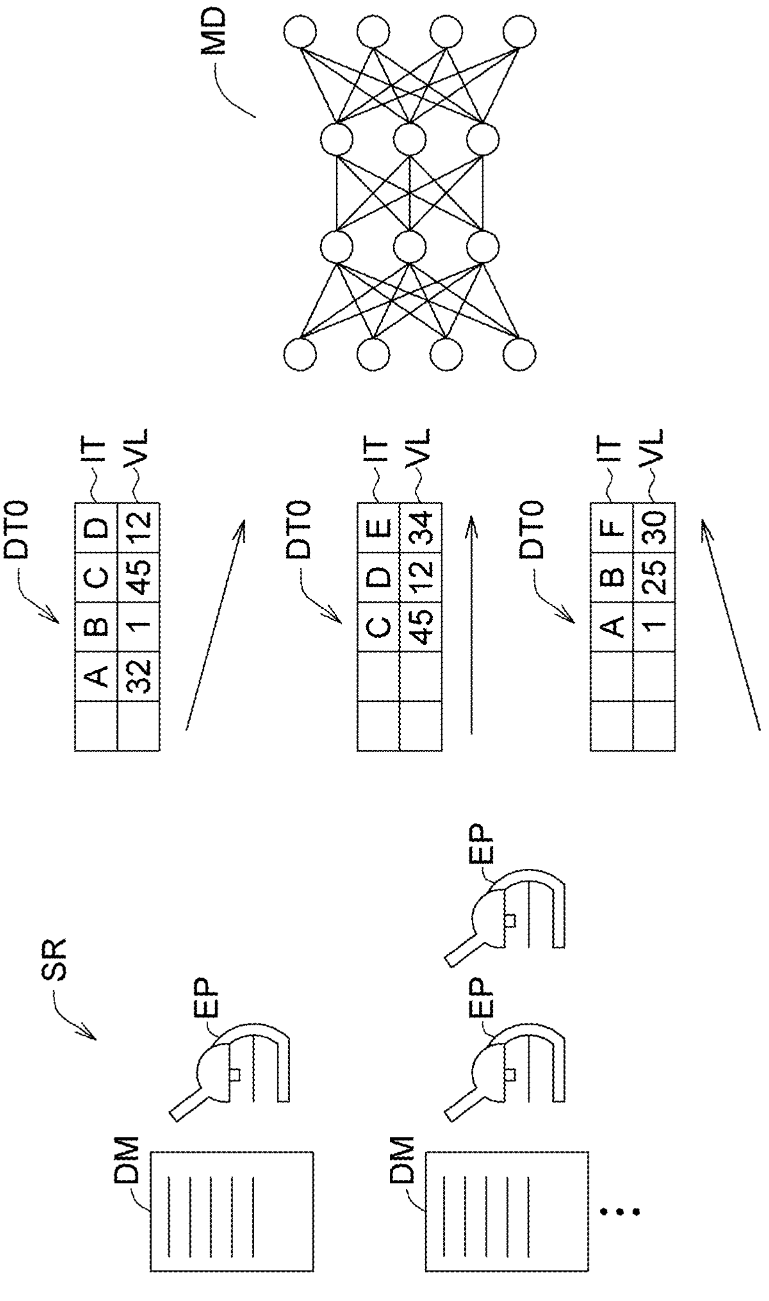
FIG. 1 exemplifies a data processing process for the machine learning according to an embodiment of the present disclosure.

Referring to FIG. 1, a data processing process for the machine learning according to an embodiment of the present disclosure is shown. According to machine learning technology, when more detection items IT are used in model building, normally prediction accuracy will be increased. However, if unsuitable detection items IT are used, prediction accuracy will decrease instead. Therefore, the detection items IT need to be selected and decided before they are used in the model building and prediction inference of the machine learning model MD.

The model building of the machine learning model MD requires a large volume of data for training purpose. To increase the data volume of the original measuring data DT0, the original measuring data DT0 are normally obtained from different sources SR. The sources SR may include different institutes DM (such as different hospitals or different research institutes) or different equipment EP.

However, the original measuring data DT0 obtained from different sources SR may contain different numeric intervals. If the original measuring data DT0 are directly used to train the machine learning model MD, the predictive effect of the machine learning model MD will be poor.

Figure 2:
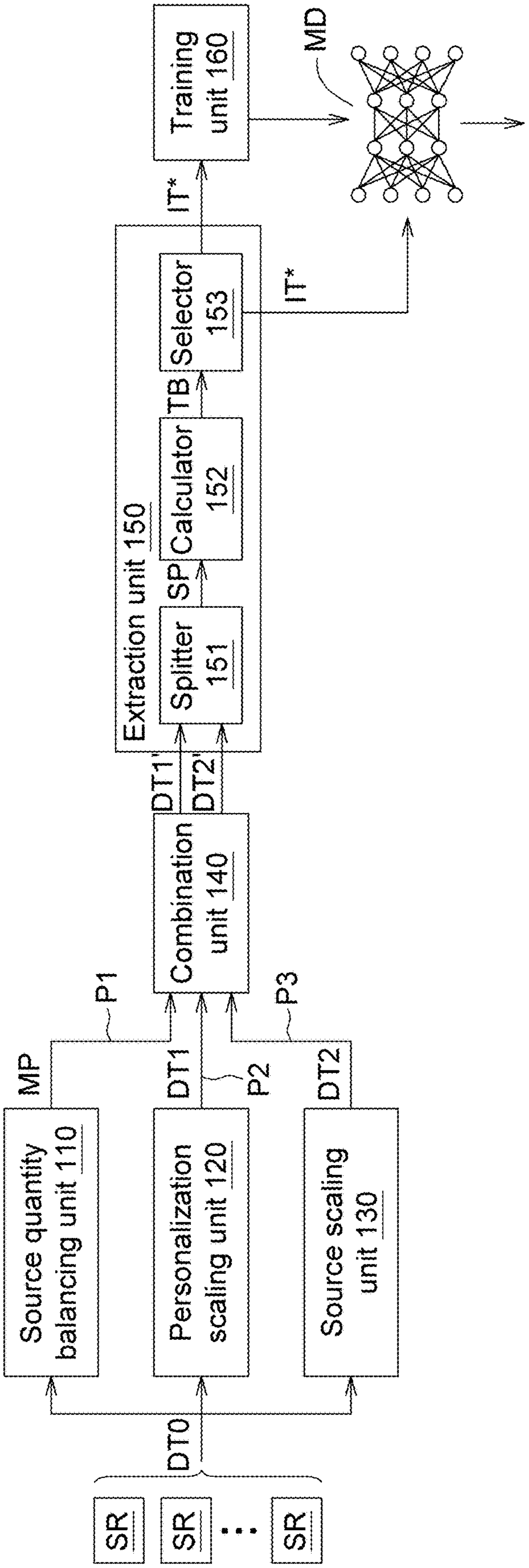
FIG. 2 exemplifies a schematic diagram of an electronic device according to an embodiment of the present disclosure.

Referring to FIG. 2, a schematic diagram of an electronic device 100 according to an embodiment of the present disclosure is shown. The electronic device 100 includes a source quantity balancing unit 110, a personalization scaling unit 120, a source scaling unit 130, a combination unit 140, an extraction unit 150 and a training unit 160. The extraction unit 150 includes a splitter 151, a calculator 152 and a selector 153. The source quantity balancing unit 110, the personalization scaling unit 120, the source scaling unit 130, the combination unit 140, the extraction unit 150 and/or the training unit 160 are used to perform various control, processing and analysis procedures, and can be realized by such as a circuit, a circuit board, a storage device for storing program code or a chip. The chip can be realized by such as a central processing unit (CPU), or other programmable or application specific micro control unit (MCU), microprocessor, digital signal processor (DSP), programmable controller, application specific integrated circuit (ASIC), graphics processing unit (GPU), image signal processor (ISP), image processing unit (IPU), arithmetic logic unit (ALU), complex programmable logic device (CPLD), field programmable gate array (FPGA) or other similar elements or a combination thereof.

In the present embodiment, the process of selecting the detection items IT of the original measuring data DT0 includes performing suitable quantity balancing and value scaling treatments on the original measuring data DT0 of different sources SR, so that prediction accuracy of the machine learning model MD can be increased. The quantity balanced and value scaled original measuring data DT0 possess excellent extendibility and are beneficial to the training and amendment of the machine learning model MD.

Figure 3:
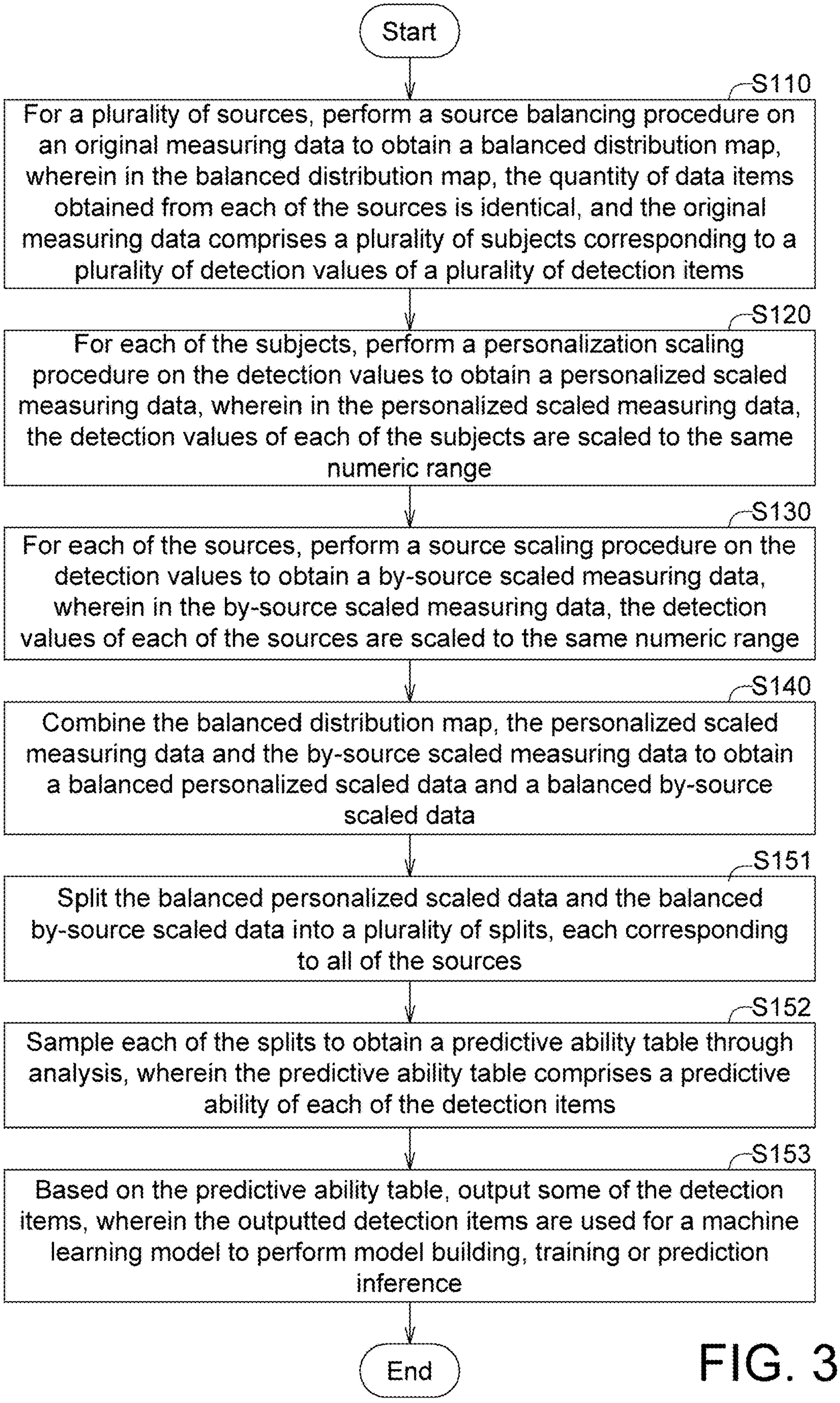
FIG. 3 illustrates a flowchart of a data processing method for the machine learning according to an embodiment.
Figure 4:
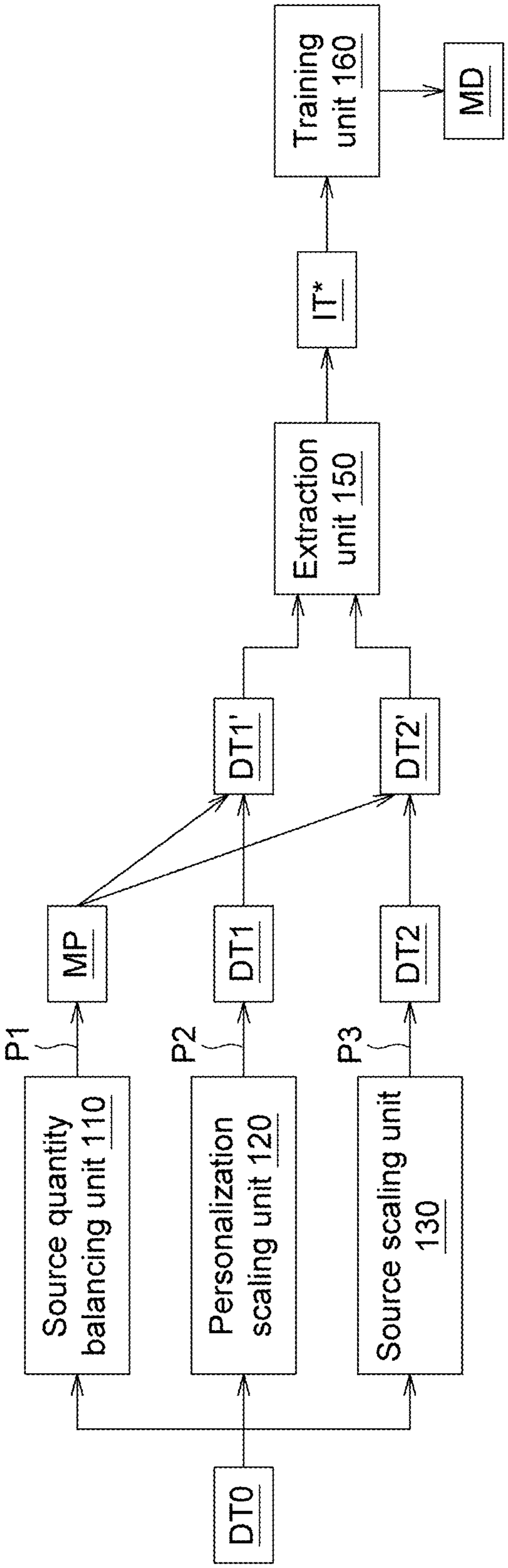
FIG. 4 exemplifies the operations of the data processing method for the machine learning of FIG. 3.

Refer to FIGS. 2 to 4. FIG. 3 illustrates a flowchart of a data processing method for the machine learning according to an embodiment. FIG. 4 exemplifies the operations of the data processing method for the machine learning of FIG. 3. In step S110, for each of the sources SR, a source balancing procedure P1 is performed on the original measuring data DT0 by the source quantity balancing unit 110 (to obtain a balanced distribution map MP. Referring to Table 1, various sources SR of the original measuring data DT0 are shown.

TABLE 1

(various sources SR of the original measuring data DT0)

| Subject US | Source SR |
|---|---|
| AA | 1 |
| BB | 1 |
| CC | 1 |
| DD | 2 |
| EE | 2 |
| FF | 2 |
| GG | 3 |
| HH | 3 |
| II | 3 |
| JJ | 3 |

The original measuring data DT0 includes the subject US and the source SR. As indicated in Table 1, of the original measuring data DT0, 3 items are obtained from the “1” source SR, 3 items are obtained from the “2” source SR, and 4 items are obtained from the “3” source SR. For the quantity of data items obtained from each of the sources SR to be identical, the data volume of the original measuring data DT0 can be increased by using an up-sampling process. For instance, as indicated in Table 2, the “CC” subject US (corresponding to the “1” source SR) is sampled twice and so is the “EE” subject US (corresponding to the “2” source SR) sampled twice, so that the quantity of data items obtained from each of the “1” source SR, the “2” source SR, and the “3” source SR is identical, that is, 4, and the balanced distribution map MP can be obtained. In the balanced distribution map MP, the quantity of data items corresponding to each of the sources SR is identical.

Besides, the problem of the same subject US being sampled for too many times can be resolved through a weighting arrangement. For instance, each time when a subject US is sampled, a weight of 1/a can be assigned to this subject US.

TABLE 2

(balanced distribution map MP)

| Subject US | Source SR |
|---|---|
| AA | 1 |
| BB | 1 |
| CC | 1 |
| DD | 2 |
| EE | 2 |

TABLE 2-continued (balanced distribution map MP)

| Subject US | Source SR |
|---|---|
| FF | 2 |
| GG | 3 |
| HH | 3 |
| II | 3 |
| JJ | 3 |
| CC | 1 |
| EE | 2 |

Referring to Table 3, a particular set of original measuring data DT0 is shown. The original measuring data DT0 include a plurality of detection values VL (such as "325", "270", . . . ) of a plurality of subjects US (such as "AA", "BB", . . . ) corresponding to a plurality of detection items IT (such as "Protein 1", "Protein 2", . . . ).

TABLE 3

(original measuring data DT0)

| | Detection items IT | | | |
|---|---|---|---|---|
| Subject US | Protein 1 | Protein 2 | Protein 3 | Source SR |
| AA | 325 | 270 | 200 | 1 |
| BB | 155 | 810 | 310 | 1 |
| CC | 160 | 790 | 210 | 1 |
| DD | 270 | 170 | 150 | 2 |
| EE | 30 | 300 | 129 | 2 |
| FF | 265 | 410 | 130 | 2 |

Next, the method proceeds to step S120, for each of the subjects US, a personalization scaling procedure P2 is performed on the detection values VL by the personalization scaling unit 120 to obtain a personalized scaled measuring data DT1. Referring to Table 4, the personalized scaled measuring data DT1 are shown.

TABLE 4

(personalized scaled measuring data DT1)

| | Detection items IT | | | |
|---|---|---|---|---|
| Subject US | Protein 1 | Protein 2 | Protein 3 | Source SR |
| AA | 1 | 0.56 | 0 | 1 |
| BB | 0 | 1 | 0.24 | 1 |
| CC | 0 | 1 | 0.08 | 1 |
| DD | 1 | 0.17 | 0 | 2 |
| EE | 0 | 1 | 0.37 | 2 |
| FF | 0.48 | 1 | 0 | 2 |
| GG | 0 | 0.23 | 1 | 3 |
| HH | 0.088 | 1 | 0 | 3 |
| II | 0 | 1 | 0.143 | 3 |
| JJ | 0.088 | 1 | 0 | 3 |
| CC | 0 | 1 | 0.079 | 1 |
| EE | 0 | 1 | 0.37 | 2 |

As indicated in Table 4, in the personalized scaled measuring data DT1, the detection values VL of each of the subjects US are scaled to the same numeric interval. For instance, of the detection values VL (such as "325", "270", and "200") of the "AA" subject US "325" is scaled as "1", "200" is scaled as "0", and "270" is scaled by proportion as "0.56". Of the detection values VL (such as "155", "810", and "310") of the "BB" subject US, "810" is scaled as "1", "155" is scaled as "0", and "310" is scaled by proportion as "0.24". By the same analogy, the maximum and minimum values of the detection values VL of the same subject US are respectively scaled as 1 and 0, and the remaining detection values VL are scaled by proportion. Thus, the difference of each of the subjects US between different detection items IT can be maintained, and the quantity of detection values VL of each of the subjects US can remain identical.

Then, the method proceeds to step S130, for each of the sources SR, a source scaling procedure P3 is performed on the detection values VL by the source scaling unit 130 to obtain a by-source scaled measuring data DT2. Referring to Table 5, the by-source scaled measuring data DT2 are shown.

TABLE 5

(by-source scaled measuring data DT2)

| | Detection items IT | | | |
|---|---|---|---|---|
| Subject US | Protein 1 | Protein 2 | Protein 3 | Source SR |
| AA | 1.41 | −1.41 | −0.81 | 1 |
| BB | −0.74 | 0.74 | 1.41 | 1 |
| CC | −0.67 | 0.67 | −0.60 | 1 |
| DD | 0.73 | −1.25 | 1.41 | 2 |
| EE | −1.41 | 0.068 | −0.76 | 2 |
| FF | 0.68 | 1.19 | −0.65 | 2 |
| GG | 0.53 | −1.72 | 1.7 | 3 |
| HH | 0.396 | 0.697 | −0.77 | 3 |
| II | −1.71 | 0.64 | −0.65 | 3 |
| JJ | 0.79 | 0.39 | −0.28 | 3 |
| CC | −0.68 | 0.67 | −0.6 | 1 |
| EE | −1.41 | 0.068 | −0.76 | 2 |

Of the by-source scaled measuring data DT2, the detection values VL of each of the sources SR are scaled to the same numeric interval. The source scaling unit 130 performs a z-score transform on the detection values VL of the same source SR. For instance, the mean value of the detection values VL (such as "325", "155", and "160") of the "1" source SR is "213.3", and the standard error is "78.99". "325" is scaled as "1.41"; firstly, "325" is deducted by the mean value, then the difference is divided by the standard error. "155" is scaled as "−0.74"; firstly, "155" is deducted by the mean value, then the difference is divided by the standard error. "160" is scaled as "−0.67"; firstly, "160" is deducted by the mean value, then the difference is divided by the standard error. By the same analogy, the z-score transform can also be performed on the detection values VL (such as "270", "30", and "265") of the "2" source SR. Thus, the differences of each of the sources SR between different subjects US can be maintained and the quantity of detection values VL of each of the sources SR can remain identical.

Through the above steps, the balanced distribution map MP as indicated in Table 2, the personalized scaled measuring data DT1 as indicated in Table 4, and the by-source scaled measuring data DT2 as indicated in Table 5 are obtained.

Then, the method proceeds to step S140, the balanced distribution map MP, the personalized scaled measuring data DT1 and the by-source scaled measuring data DT2 are combined by the combination unit 140 to obtain a balanced personalized scaled data DT1' and a balanced by-source scaled data DT2'. Referring to Table 6, the balanced personalized scaled data DT1' and the balanced by-source scaled data DT2' are shown.

TABLE 6

(balanced personalized scaled data DT1' and balanced by-source scaled data DT2')

| | | Balanced personalized scaled data DT1' | | | Balanced by-source scaled data DT2' | | |
|---|---|---|---|---|---|---|---|
| Subject US | Source SR | Protein 1 | Protein 2 | Protein 3 | Protein 1 | Protein 2 | Protein 3 |
| AA | 1 | 1 | 0.56 | 0 | 1.41 | −1.41 | −0.81 |
| BB | 1 | 0 | 1 | 0.24 | −0.74 | 0.74 | 1.41 |
| CC | 1 | 0 | 1 | 0.08 | −0.67 | 0.67 | −0.60 |
| DD | 2 | 1 | 0.17 | 0 | 0.73 | −1.25 | 1.41 |
| EE | 2 | 0 | 1 | 0.37 | −1.41 | 0.068 | −0.76 |
| FF | 2 | 0.48 | 1 | 0 | 0.68 | 1.19 | −0.65 |
| GG | 3 | 0 | 0.23 | 1 | 0.53 | −1.72 | 1.7 |
| HH | 3 | 0.088 | 1 | 0 | 0.396 | 0.697 | −0.77 |
| II | 3 | 0 | 1 | 0.143 | −1.71 | 0.64 | −0.65 |
| JJ | 3 | 0.088 | 1 | 0 | 0.79 | 0.39 | −0.28 |
| CC | 1 | 0 | 1 | 0.079 | −0.68 | 0.67 | −0.6 |
| EE | 2 | 0 | 1 | 0.37 | −1.41 | 0.068 | −0.76 |

Figure 5:
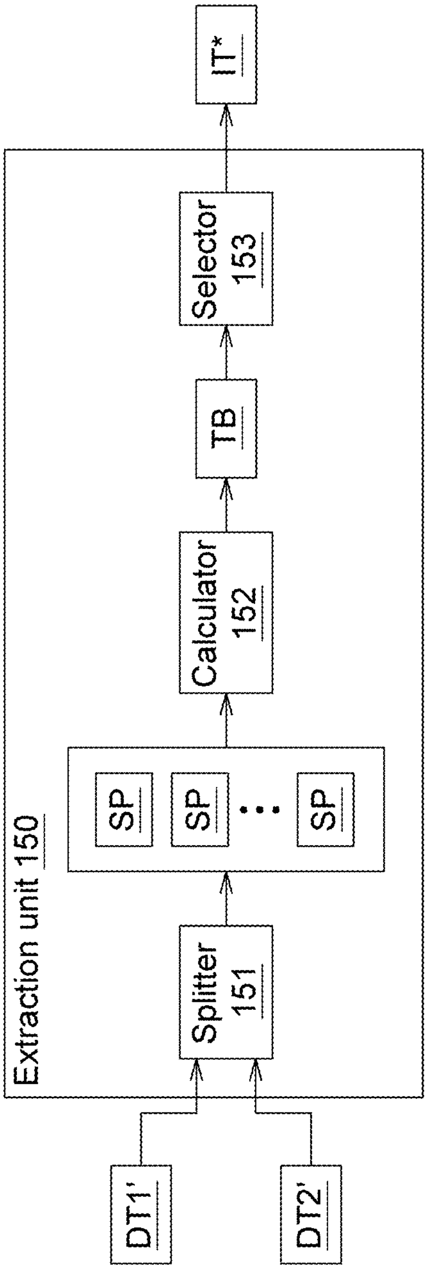
FIG. 5 exemplifies the operations of an extraction unit.

Then, the method proceeds to steps S151 to S153. Referring to FIG. 5, operations of the extraction unit 150 are shown. The splitter 151, the calculator 152 and the selector 153 of the extraction unit 150 sequentially perform steps S151 to S153.

In step S151, the balanced personalized scaled data DT1' and the balanced by-source scaled data DT2' are split into a plurality of split SP by the splitter 151 of the extraction unit 150, wherein each of the splits SP corresponds to all of the sources SR.

Figure 6:
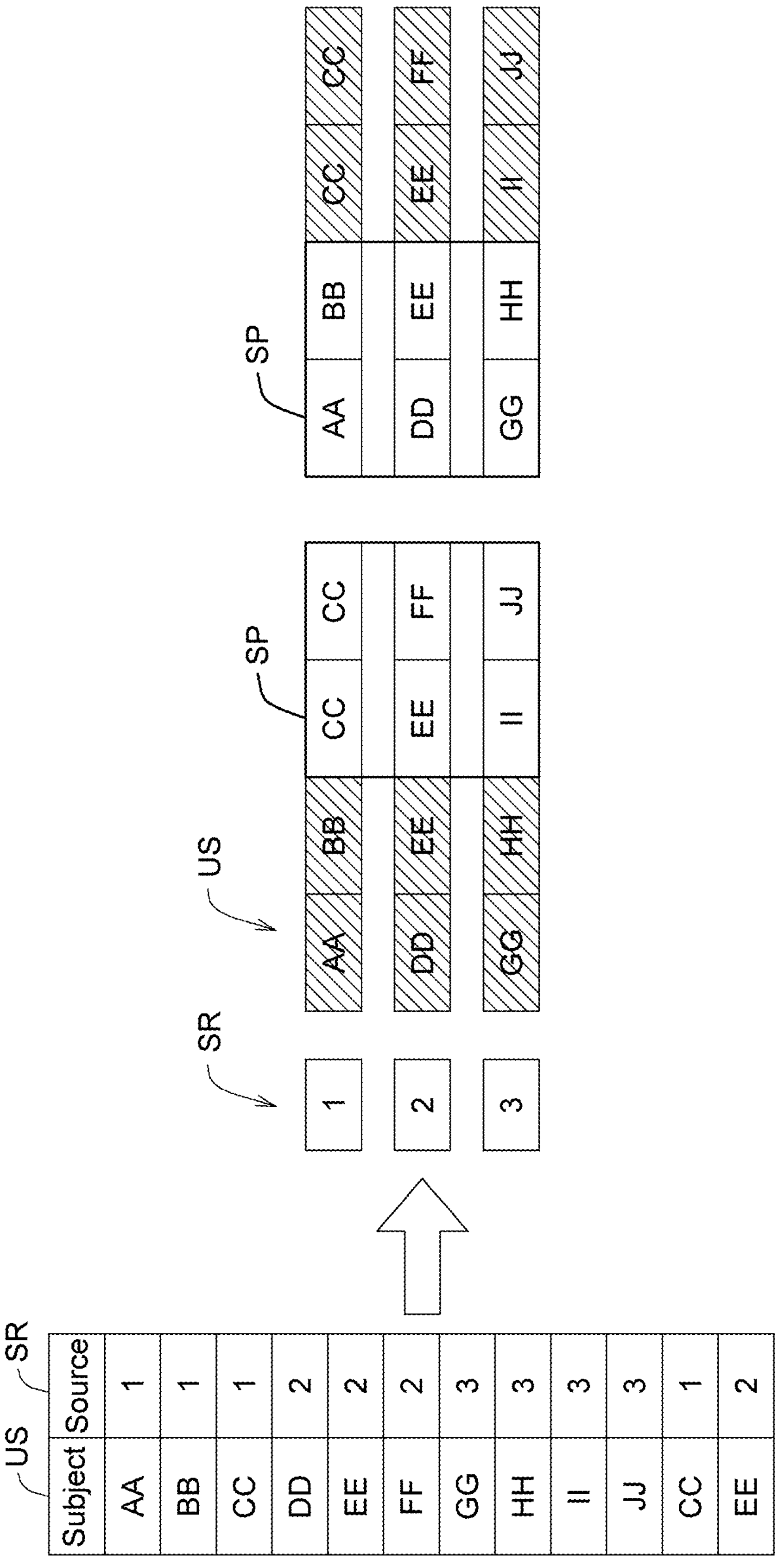
FIG. 6 exemplifies step S151.

Referring to FIG. 6, details of step S151 are shown. FIG. 6 exemplifies the step of dividing the data into two splits SP. The data volume of the two splits SP is identical (for instance, each of the splits contains 6 groups of data), and the union of the splits SP covers all of the subjects US (such as “AA” to “JJ”). Besides, the subjects US are not identical in different splits SP.

Then, the method proceeds to step S152, each of the splits SP is sampled by the calculator 152 of the extraction unit 150 to obtain a predictive ability table TB through analysis. Referring to Table 7, the predictive ability table TB is shown.

TABLE 7

(predictive ability table TB)

| | Balanced personalized scaled data DT1' | | | Balanced by-source scaled data DT2' | | |
|---|---|---|---|---|---|---|
| Split SP | Protein 1 | Protein 2 | Protein 3 | Protein 1 | Protein 2 | Protein 3 |
| 1 | 0.10 | 0.19 | 0.18 | 0.31 | 0.01 | 0.09 |
| 2 | 0.12 | 0.18 | 0.21 | 0.29 | 0.04 | 0.11 |

The predictive ability table TB includes the predictive ability of each of the detection items IT The calculator 152 can perform random sampling on each of the splits SP. For instance, to calculate the predictive ability, each of the splits SP is sampled for 10 times. Then, the mean value can be calculated to obtain the values of Table 7.

Next, the method proceeds to step S153, some of the detection items IT* are outputted by the selector 153 based on the predictive ability table TB. Referring to Table 8, total scores of predictive ability of respective detection item IT are shown.

TABLE 8

| | Balanced personalized scaled data DT1' | | | Balanced by-source scaled data DT2' | | |
|---|---|---|---|---|---|---|
| | Protein 1 | Protein 2 | Protein 3 | Protein 1 | Protein 2 | Protein 3 |
| Total score of predictive ability | 0.22 | 0.37 | 0.39 | 0.60 | 0.05 | 0.20 |

The selector 153 adds up the predictive abilities of each of the splits SP to a obtain a total score of predictive ability for each of the splits, then outputs the two detection items IT* whose scores are the highest. Take Table 8 for instance, the “Protein 1” of the balanced by-source scaled data DT2' and the “Protein 3” of the balanced personalized scaled data DT1' are outputted.

Referring to Table 9, the “Protein 1” of the balanced by-source scaled data DT2' and the “Protein 3” of the balanced personalized scaled data DT1', which are lastly outputted, are shown.

TABLE 9

| Subject US | Balanced personalized scaled data DT1' Protein 3 | Balanced by-source scaled data DT2' Protein 1 |
|---|---|---|
| AA | 0 | 1.41 |
| BB | 0.24 | −0.74 |
| CC | 0.08 | −0.67 |
| DD | 0 | 0.73 |
| EE | 0.37 | −1.41 |
| FF | 0 | 0.68 |
| GG | 1 | 0.53 |
| HH | 0 | 0.396 |
| II | 0.143 | −1.71 |
| JJ | 0 | 0.79 |
| CC | 0.079 | −0.68 |
| EE | 0.37 | −1.41 |

The outputted detection items IT* are used for the machine learning model MD to perform model building, training or prediction inference. As indicated in FIG. 2, the detection items IT* can be provided for the training unit 160 to obtain a machine learning model MD with high accuracy through training. When performing prediction inference, the detection values of the detection items IT* are outputted to the machine learning model MD to obtain a prediction result with high accuracy.

Refer to Table 10. The technology of the present disclosure technology possesses excellent extendibility. Each time when new source data are added, existing model can directly be used for prediction, or the new source data can directly be added to the training data without having to amend the data format or add a column of new source). In the predictive experiment of physical cognitive decline syndrome (PODS), the training model of the technology of the present disclosure using combined data of various sources produces higher accuracy, sensitivity, specificity, positive predictive value, negative predictive value, and area under the ROC curve than the training model using mono source data.

TABLE 10

| | Training and testing new source data of mono source | Combining two sources |
|---|---|---|
| Accuracy | 0.55 | 0.70 |
| Sensitivity | 0.61 | 0.72 |
| Specificity | 0.48 | 0.67 |
| Positive Predictive Value (PPV) | 0.57 | 0.69 |
| Negative predictive value (NPV) | 0.53 | 0.71 |
| Area under the ROC curve (AUC) | 0.58 | 0.75 |

According to the above embodiments, the process of selecting the detection items IT of the original measuring data DT0 includes performing a source balancing procedure P1, a personalization scaling procedure P2, and a source scaling procedure P3 on the original measuring data DT0 of different sources SR, so that prediction accuracy of the machine learning model MD can be increased. Moreover, the quantity balanced and value scaled original measuring data DT0 possess excellent extendibility and are beneficial to the training and amendment of the machine learning model MD.

The characteristics of some implementations or examples for implementing the present disclosure are disclosed above. Some specific examples describing the elements and disposition of the present disclosure (such as the values and names) are provided to simply or exemplify some implementations of the present disclosure. The elements and configuration are for exemplary purpose only, not for limiting the present disclosure. Moreover, the designations and/or alphabets can be repeated in some implementations of the present disclosure for the purpose of clarity and simplicity without specifying the relationships between various implementations and/or configurations of the present disclosure.

While the invention has been described by way of example and in terms of the preferred embodiment(s), it is to be understood that the invention is not limited thereto. Based on the technical features embodiments of the present invention, a person ordinarily skilled in the art will be able to make various modifications and similar arrangements and procedures without breaching the spirit and scope of protection of the invention. Therefore, the scope of protection of the present invention should be accorded with what is defined in the appended claims.

What is claimed is:

1. A data processing method for machine learning, comprising:

for a plurality of sources, performing a source balancing procedure on an original measuring data to obtain a balanced distribution map, wherein in the balanced distribution map, a quantity of data items obtained from each of the sources is identical, the original measuring data comprises a plurality of subjects corresponding to a plurality of detection values of a plurality of detection items, the sources include different institutes or different equipment, and the source balancing procedure is used to balance the quantities of the data items obtained from different institutes or different equipment are identical;

for each of the subjects, performing a personalization scaling procedure on the detection values to obtain a personalized scaled measuring data, wherein in the personalized scaled measuring data, the detection values of each of the subjects are scaled to identical numeric interval;

for each of the sources, performing a source scaling procedure on the detection values to obtain a by-source scaled measuring data, wherein in the by-source scaled measuring data, the detection values of each of the sources are scaled to identical numeric interval, and the detection values of each of the institutes or equipment are scaled to identical numeric interval;

combining the balanced distribution map, the personalized scaled measuring data and the by-source scaled measuring data to obtain a balanced personalized scaled data and a balanced by-source scaled data;

splitting the balanced personalized scaled data and the balanced by-source scaled data into a plurality of splits, each corresponding to all of the sources;

sampling each of the splits to obtain a predictive ability table through analysis, wherein the predictive ability table comprises a predictive ability of each of the detection items; and based on the predictive ability table, outputting some of the detection items, wherein the outputted detection items are used for a machine learning model to perform model building, training or prediction inference.

2. The data processing method for the machine learning according to claim 1, wherein the source balancing procedure adopts an up-sampling process to increase data volume of the original measuring data.

3. The data processing method for the machine learning according to claim 1, wherein in the personalization scaling procedure, a maximum value and a minimum value among the detection values of one of the subjects are respectively scaled as 1 and 0.

4. The data processing method for the machine learning according to claim 1, wherein in the source scaling procedure, the detection values of one of the sources are processed with a z-score transform.

5. The data processing method for the machine learning according to claim 1, wherein data volume of each of the splits is identical.

6. The data processing method for the machine learning according to claim 1, wherein union of the splits correspond all of the subjects.

7. The data processing method for the machine learning according to claim 1, wherein the subjects for the splits are not identical.

8. The data processing method for the machine learning according to claim 1, wherein the sampling performed on each of the splits is random sampling.

9. The data processing method for the machine learning according to claim 1, wherein the sources are different entities.

10. The data processing method for the machine learning according to claim 1, wherein the sources are different apparatuses.

11. An electronic device, comprising:

a source quantity balancing unit, used to, for a plurality of sources, perform a source balancing procedure on an original measuring data to obtain a balanced distribution map, wherein in the balanced distribution map, a quantity of data items obtained from each of the sources is identical, the original measuring data comprises a plurality of subjects corresponding to a plurality of detection values of a plurality of detection items, the sources include different institutes or different equipment, and the source balancing procedure is used to balance the quantities of the data items obtained from different institutes or different equipment are identical;

a personalization scaling unit used to, for each of the subjects, perform a personalization scaling procedure on the detection values to obtain a personalized scaled measuring data, wherein in the personalized scaled measuring data, the detection values of each of the subjects are scaled to identical numeric interval;

a source scaling unit used to, for each of the sources, perform a source scaling procedure on the detection values to obtain a by-source scaled measuring data, wherein in the by-source scaled measuring data, the detection values of each of the sources are scaled to identical numeric interval, and the detection values of each of the institutes or equipment are scaled to identical numeric interval;

a combination unit used to combine the balanced distribution map, the personalized scaled measuring data and the by-source scaled measuring data to obtain a balanced personalized scaled data and a balanced by-source scaled data; and an extraction unit, comprising:

a splitter used to split the balanced personalized scaled data and the balanced by-source scaled data into a plurality of splits, each corresponding to all of the sources;

a calculator used to sample each of the splits perform and obtain a predictive ability table through analysis, wherein the predictive ability table comprises a predictive ability of each of the detection items; and a selector used to, based on the predictive ability table, output some of the detection items, wherein the outputted detection items are used for a machine learning model to perform model building, training or prediction inference.

12. The electronic device according to claim 11, wherein the source quantity balancing unit adopts an up-sampling process to increase data volume of the original measuring data.

13. The electronic device according to claim 11, wherein the personalization scaling unit respectively scales a maximum value and a minimum value among the detection values of one of the subjects as 1 and 0.

14. The electronic device according to claim 11, the source scaling unit performs a z-score transform on the detection values of one of the sources.

15. The electronic device according to claim 11, wherein the data volume of each of the splits obtained by the splitter is identical.

16. The electronic device according to claim 11, wherein union of the splits correspond all of the subjects.

17. The electronic device according to claim 11, wherein the subjects of the splits obtained by the splitter are not identical.

18. The electronic device according to claim 11, wherein the calculator performs random sampling on each of the splits.

19. The electronic device according to claim 11, wherein the sources are different entities.

20. The electronic device according to claim 11, wherein the sources are different apparatuses.

* * * * *